United States Patent [19]

DeVoy et al.

[11] 3,810,231

[45] May 7, 1974

[54] NOISE RECORD PROCESSING FOR PHASE ENCODED DATA

[75] Inventors: David D. DeVoy, Dedham; George J. Barlow, Tewksbury; John A. Klashka, Andover, all of Mass.

[73] Assignee: Honeywell Information Systems, Inc., Waltham, Mass.

[22] Filed: Jan. 2, 1973

[21] Appl. No.: 320,229

[52] U.S. Cl. .......................................... 360/40
[51] Int. Cl. .......................................... G11b 5/06
[58] Field of Search 340/174.1 G, 174.1 H, 174.1 B

[56] References Cited

UNITED STATES PATENTS

| | | | |
|---|---|---|---|
| 3,490,013 | 1/1970 | Lawrence | 340/174.1 H |
| 3,702,996 | 11/1972 | Wolfer | 340/174.1 H |
| 3,736,581 | 7/1971 | Breiicss | 340/174.1 H |

*Primary Examiner*—Vincent P. Canney
*Attorney, Agent, or Firm*—Faith F. Driscoll; Ronald T. Reiling

[57] ABSTRACT

A magnetic tape system includes apparatus for determining when an actual data record should be processed by the system. The apparatus includes a plurality of resettable one shot circuits coupled to receive signals from a corresponding number of information channels. The output signals from the circuits are combined to produce an average rate output signal and the signal is applied to at least one further resettable one shot circuit which is operative to produce an output signal when the average rate input signal persists for a predetermined number of frames. The last resettable one shot circuit applies the output signal to the remainder of the system conditioning it to process the subsequently read information signals as part of an actual data record.

22 Claims, 4 Drawing Figures

PATENTED MAY 7 1974 3,810,231

SHEET 1 OF 4

NOISE RECORD PROCESSING FOR PHASE ENCODED DATA

BACKGROUND OF THE INVENTION

1. Field of Use

This invention relates to apparatus for recovering of high density recorded data signals from a magnetic medium and more particularly to apparatus for eliminating the effects of noise signals recorded on the magnetic medium.

2. Prior Art

It has generally been found that during the reading of digital data signals from a magnetic medium, the magnetic sensing apparatus can apply as data signals to the remainder of a magnetic recovery system nondata signals produced as a result of foreign particules or improper coding of the magnetic medium or improper erasure of the magnetic medium as well as noise signals produced by the magnetic sensing apparatus. As a result, a magnetic data recovery system can treat these signals as data signals and initiate the processing of these signals. When "noise signals" initiate the erroneous processing of a record or block of data, the resulting signals produced and stored have been referred to as a "noise record".

One prior art has provided apparatus for detecting and eliminating the effects of noise signals. The apparatus establishes a minimum count of signals which must be exceeded in order for the signals to be considered as part of an actual data record. Pat. No. 3,490,013, entitled "Apparatus For Detecting And Eliminating Noise Records During A Data Transfer Operation", invented by R. B. Lawrence et al., which issued Jan. 13, 1970, assigned to the assignee named herein illustrates this type of system.

Because of the amount of data skewing associated with data signals recorded as high densities, it has been found that it is unreliable to count the number of frames of signals which have been read from a magnetic medium in order to determine whether those frames constitute an actual data record. The reason that this requires the system to already be in synchronization to the incoming data rate. Adjusting the system timing in such instances could result in the system not being able to detect subsequently read data records.

Another prior art data recovery system has employed a series of one shot circuits in which a first one of the one shot circuits is switched in response to a transition occurring in any one of the channels of the magnetic medium. At the termination of the pulse produced by the first one shot circuit, a second one shot circuit is enabled by the first one shot circuit to be triggered when another transition occurs in another channel of the medium. When a transition is sensed in one of the channels at the end of the interval established by both one shot circuits, the read recovery apparatus of the system is enabled to process the subsequently sensed signals.

It has been found that any occurrence of noise signals at the above-defined points of time could result in the improper enabling of the read recovery circuits thereby making the circuits sensitive to noise records.

Accordingly, it is a primary object of this invention to provide an improved data recovery system which is not sensitive to noise records.

It is a further object of the present invention to provide a more reliable data recovery system which is particularly suited for processing high density recorded magnetic signals.

It is a more specific object of the present invention to provide improved data recovery apparatus which uses a minimal amount of additional logic circuits and which operates only in response to the signals from the magnetic medium.

SUMMARY OF THE INVENTION

These and other objects are achieved according to the present invention in a preferred embodiment which includes a first group of resettable one shot circuits arranged to produce output signals in response to signals derived from different channels of the magnetic medium when these signals are received at a predetermined rate. The output signals from these one shot circuits are combined to produce an output signal which represents an average rate of the signals from each channel. The output signal is applied to at least one further resettable one shot circuit which is operative to produce an output signal when the average rate signal persists for a predetermined period of time indicating that a predetermined number of frames or bytes have been processed. When both criteria has been met, indicated by the output signal from the resettable one shot circuit, the remaining circuits are conditioned to process the subsequently read signals as an actual record. In the preferred embodiment, the output signal is used to enable the read clock circuits of each channel to get in synchronization with the rate of the incoming signals. Additionally, the same signal switches on a third one shot circuit which enables the recovery system at the end of a predetermined time interval to transfer the signals being read from the medium to the rest of the system for processing.

The arrangement of the present invention has application in processing signals recorded at high densities on a magnetic medium using phase encoding techniques and similar techniques in which the recorded data appears as a succession of short and long duration one-half wave lengths.

In high density recording systems, such as those having signals recorded at rates of 1,600 or 3,200 bits per inch, which employ phase encoding, the signal recovery circuits for each channel on the magnetic medium are self-clocking. That is, during the recovery of signals from the medium, the signal recovery circuits operate at a frequency derived from the signals sensed from the magnetic medium. Since each cell which records a bit of data in a high density recording system is extremely short along the length of the medium, self-clocking arrangements are required in order to reliably recover the recorded data at these high densities. For the same reason, the arrangement of the present invention is able to reliably signal that the system is reading an actual record by arranging the apparatus of the invention to have its operation responsive only to signals sensed from the magnetic medium.

In recovering high density recorded data signals from the medium, the apparatus of the invention when having sensed from a plurality of channels a continuous burst of signals such as those found in a preamble portion of a block of data which occur at a predetermined rate and for a predetermined period of time, the apparatus of the invention is operative to generate signals for conditioning the remainder of the data recovery circuits to enable the system to start processing the signals as an actual data record. This involves, as mentioned, first having the read clock circuits of each channel enabled so as to allow them to adjust their frequencies to operate in synchronization with the signals being read from the magnetic recording medium. Thus, only after the high density signals have met a plurality of criteria relating to rate and number of frames are the read clock circuits enabled to start synchronizing. This obviates the problem of having the frequencies of the read clock circuits inadvertently adjusted to other than "actual data records" which can subsequently render the circuits unable to process actual data records within the time required. To reliably determine that synchronization is in fact attained before data is actually read in process, a further resettable one shot circuit can be arranged to be switched only after an additional predetermined number of consecutive frames have been received and these frames have occurred consecutively at the predetermined rate. This arrangement of the invention establishes a still further criteria which must be met before data processing takes place.

The above and other objects of this invention are achieved in a preferred embodiment described hereinafter. Novel features which are believed to be characteristic of the invention both as to its organization and method of operation. Together with further objects and advantages will be better understood from the following description when considered in connection with the accompanying drawings. It is to be expressly understood, however, that these drawings are for the purpose of illustration and description only and are not intended as a definition of the limits of the present invention.

DETAILED DESCRIPTION OF THE DRAWINGS

Figure 1:
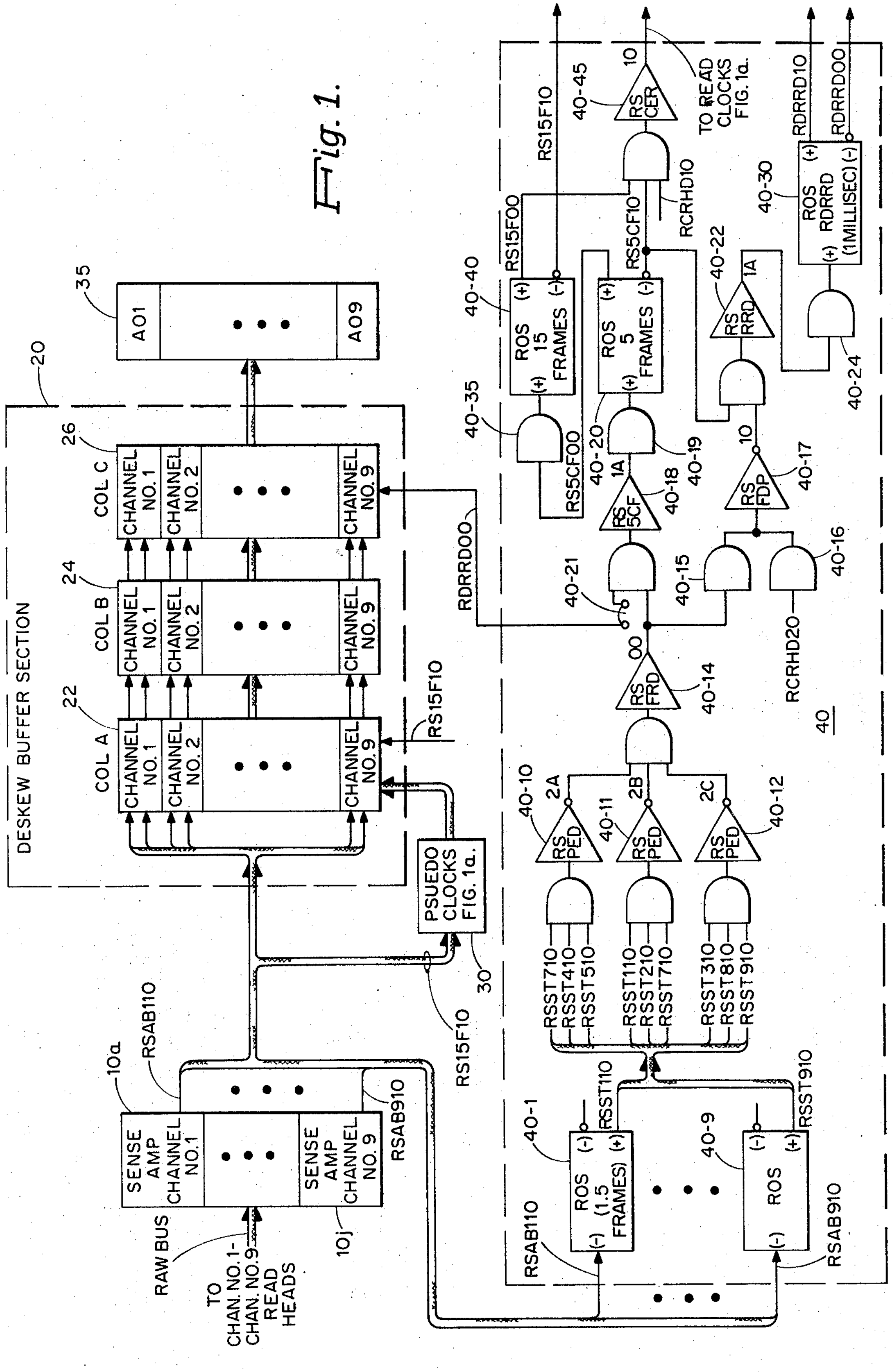
FIG. 1 illustrates in block form a portion of a multichannel high density recording system which includes the deskewing buffer circuits.

FIG. 1 shows in block form, the recovery portion of a magnetic tape system coupled to receive signals from a plurality of channel sense amplifier circuits **10*a* through 10*j*. The sense amplifier circuits which for the purposes of this invention can be considered conventional in design are operative to sense the positive and negative transitions of the phase encoded signals from nine channels of a magnetic tape media, not shown. The amplifier circuits 10*a* through 10*j* in response to the sensed signals, generate pulses at data ONES and data ZEROS terminals which are in turn applied to other portions of the system which include a deskew buffer section 20, pseudo clock circuits 30 and the read allow section 40. When the magnetic tape medium is being read in a forward direction, the pulses appearing at the data ONES terminal represent the positive going transition signals while the pulses appearing at the data ZEROS terminal represent the negative going transition signals. The deskew buffer section 20 for the purposes of the present invention can be considered conventional in design and includes three buffer registers 22, 24 and 26 which couple in series as shown and provide for sequential parallel transfers of characters. These buffer circuits provide sufficient storage to "deskew" or align properly the asynchronously arriving information bit signals from each of channels to form a character or byte. Each of the characters assembled in register 26** are then transferred to the data processing section.

Figure 2:
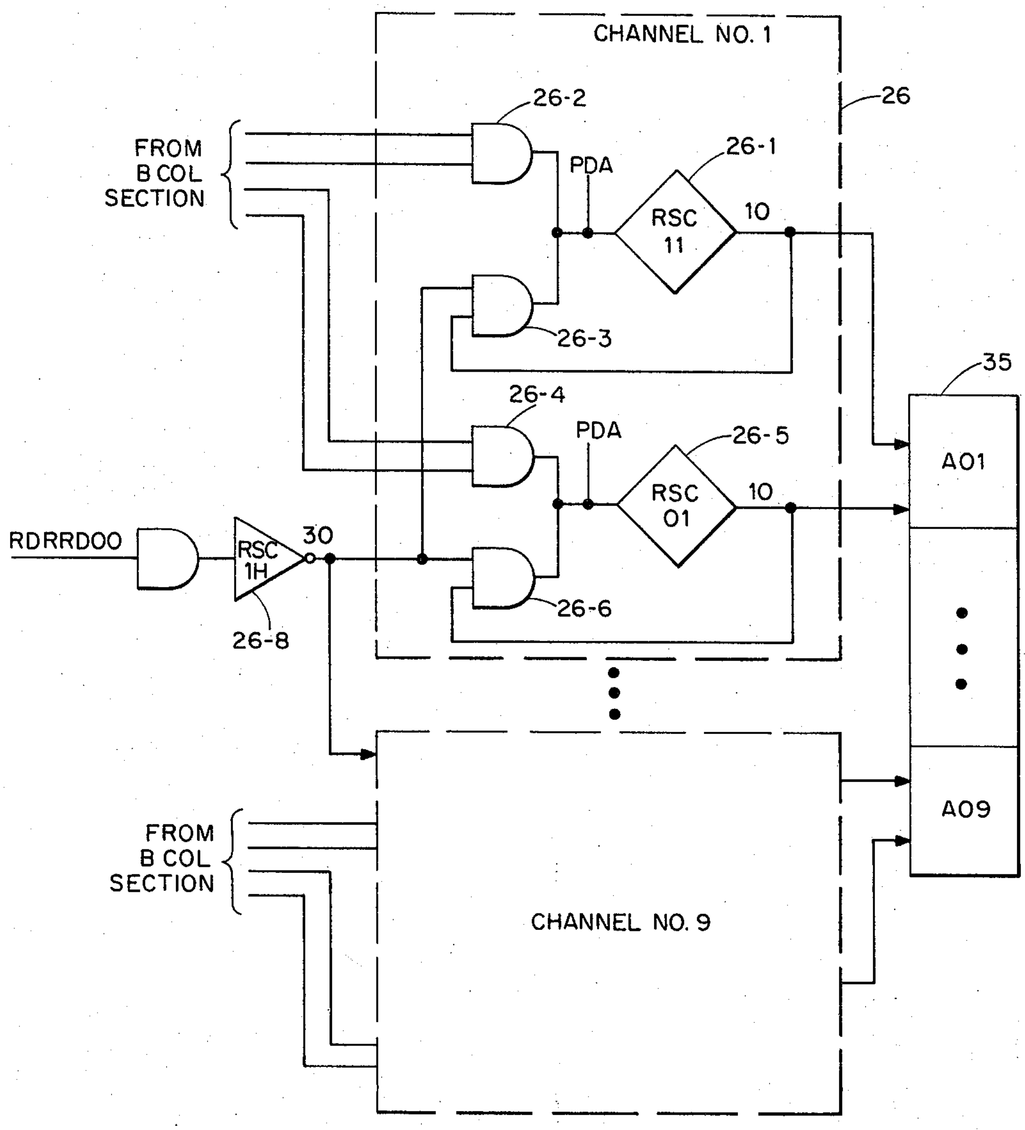
FIG. 2 shows a set of waveforms used to illustrate the operation of the apparatus of the present invention.

In the preferred embodiment, each channel of each of the registers 22, 24 and 26 have two flip-flop stages, a representative stage of which is illustrated in FIG. 2. As seen from the figure, each channel has a pair of flip-flops 26-1 and 26-4, each of which couple to receive a set of signals via AND gates 26-2 and 26-5 from the stages of previous register 22. Additionally, both of the flip-flops receive a hold signal RSC1H30 from a gate and inverter circuit 26-8 which is applied to AND gates 26-3 and 26-5 as shown. When a binary ONE is stored in channel 1, flip-flops 26-1 and 26-5 are switched to their binary ONE and binary ZERO states respectively. When the channel stores a binary ZERO, flip-flops 26-1 and 26-5 are switched to a binary ZERO and a binary ONE respectively. The output signals from the ONE data flip-flop of each channel representative of a byte or character are then stored in corresponding stages of an A register of the data processing section for processing which includes checking, decoding or transfer to a central processing unit.

Figure 1A:
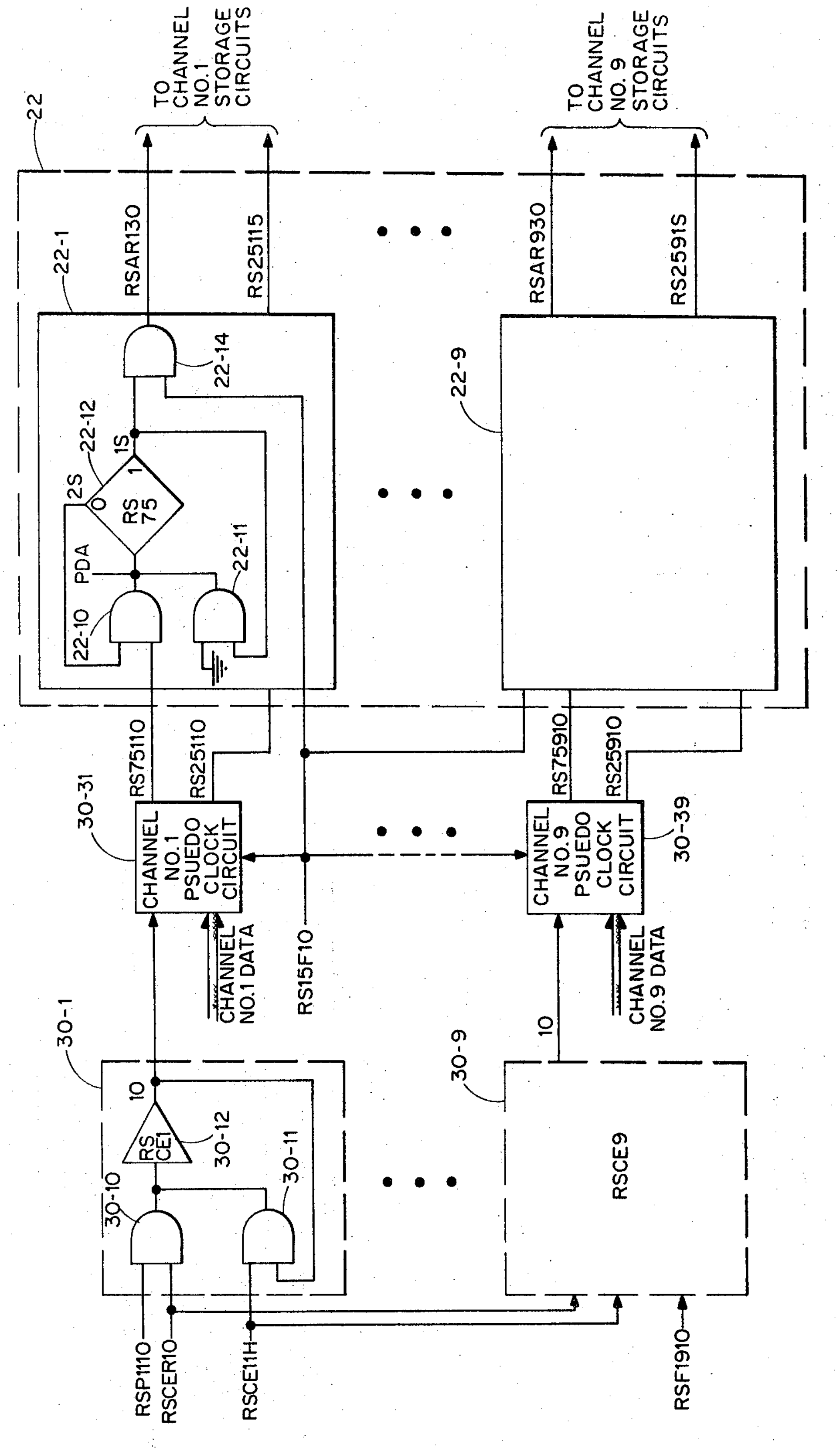
FIG. 1*a* shows in block form the read clock circuits of FIG. 1.

As mentioned, the pseudo clock circuits for each channel included in block 30 also receive the phase encoded pulses from the channel sense amplifier circuits **10*a* through 10*j* of FIG. 1. FIG. 1*a* shows the pseudo clock section in greater detail. As seen from FIG. 1*a*, each channel includes a latching enable circuit such as circuits 30-1 and 30-9, and a pseudo clock circuit such as circuits 30-31 and 30-39.**

For the purposes of the present invention, each of the pseudo clock circuits is conventional in design and may take the form of a voltage controlled oscillator arranged to have its frequency controlled and adjusted by the rate of the input information signals. Each pseudo clock circuit produces sets of pulses called a 25 percent pulse (i.e., pulse signal RS25110) and a 75 percent pulse (i.e., pulse signal RS75110) which define a "window" or time interval during which the circuits of each channel sample the data bit signals sensed by the sense amplifier circuits. The pulse signal RS25110 and RS75110 are generated to coincide with the 25 percent point and 75 percent point respectively of a data bit cell interval. The signal RS75110 "opens" the window and allows the channel circuits to receive and store data signals while the signal RS25110 "closes" the window thereby inhibiting the channel circuits from receiving any further data signals.

As seen from FIG. **1*a*, each pseudo clock circuit is enabled via its associated latch circuit (e.g. circuit 30-1 or 30-9) in response to a clock enable signal RSCER10 being forced to a binary ONE in coincidence with the application of a pulse signal from the data ONE output terminal of the sense amplifier circuit associated therewith (e.g. when either signal RSP1110 or signal RSP1910 is forced to a binary ONE). The circuit 30-1 is switched to a binary ONE via an AND gate 30-10. The circuits 30-1 through 30-9 are held in their states by a hold signal RSCE11H** which is normally a binary ONE when the system is engaged in a read mode of operation. Thus, AND gate 30-11 holds amplifier circuit 30-12 in its binary ONE state until signal RSCE11H is switched to a binary ZERO. Because during initial synchronization, the pseudo clock circuits could be erroneously synchronized, a signal RS15F10 is used to inhibit the clock circuits from being responsive to the pulses from data ONE output terminals of the sense amplifier circuits until the clock circuits should have attained synchronization with the input bit rate. The circumstances under which signal RS15F10 is generated in accordance with the present invention will be explained hereinafter in greater detail with reference to FIG. 1.

As seen from FIG. 1*a*, signal RS15F10 is applied to an input timing flip-flop 22-12 of the register 22. This flip-flop switches to a binary ONE state in response to pulse signal RS75110 applied via an AND gate 22-10 and resets to a binary ZERO via an AND gate 22-10 in response to a clock pulse PDA. The resulting binary ONE output pulse signal is applied to the channel 1 storage circuits of the register 22 via an AND gate 22-14 only when signal RS15F10 is a binary ONE. The remainder of the channel circuits of register 22 operate in a similar fashion. The signal RS25110 is also applied to a flip-flop, not shown, which operates like flip-flop 22-12. The resulting binary ONE output pulse signal RS2511S produced by the flip-flop is directly applied to channel 1 storage circuits of the register 22.

With reference to FIG. 1, the synchronization allow circuits 40 of the present invention will now be described. The circuits 40 include a plurality of resettable one shot circuits 40-1 through 40-9 whose positive (+) output terminals are logically combined by a plurality of AND gate and inverter circuits 40-10 through 40-12 as shown. The output terminals of these circuits are further logically combined in an AND gate circuit 40-14.

The output signal RSFRD00 generated by AND gate circuit 40-14 is applied to a pair of resettable one shot circuits 40-30 via the gate circuits 40-18, 40-19, 40-15, 40-22, 40-24 and inverter circuit 40-17 as shown. The gate 40-18 via jumper wire 40-19 can selectively combine signal RSFRD00 with the signal RSRRD00 generated at the positive output terminal of the record detector resettable one shot circuit 40-30. The negative (−) output terminal of circuit 40-30 applies record detector signal RSRRD10 to the tape control circuits of the tape device and to other circuits within the data recovery system signalling them of the start of data record processing.

The positive and negative output terminals of the resettable one shot circuit 40-20 are applied to a further resettable one shot circuit 40-40 via a gate 40-35 and an AND gate and amplifier circuit 40-45 respectively. Additionally, AND gate circuit 40-45 receives a control signal RCRHD10, the complement of which is applied to inverter circuit 40-17 via a gate 40-16. The signal RCRHD10 is normally a binary ONE when the system is performing a phase encoded read operation.

Now the various resettable one shot circuits will be considered in greater detail. Each of the input one shot circuits can be considered conventional in design and may take the form of the circuits described in a publication titled "9661 Retriggerable Monostable Multivibrator", published in September, 1968 by Fairchild Semiconductor Inc. Each resettable one shot circuit includes a resistor and capacitor network which provides an RC time constant which determines the duration of the output pulse applied to the (+) output terminal of the circuit. The circuit also is arranged to produce a continuous output signal when it receives pulses within a predetermined period of time which is less than the RC time constant of the circuit. It is also seen that the circuit provides at the (−) output terminal the complement or inversion of the output pulse.

Each of the resettable one shot (ROS) circuits 40-1 through 40-9 produce an output pulse at its (+) terminal which has pulse width of 9 microseconds which corresponds to an interval of 1.5 frames or bit cells. Each ROS circuit triggers in response to the negative going transitions of pulses (e.g. 400 nanoseconds typically) from both data ONE and data ZERO output terminals of the sense amplifier circuits. As long as each of the ROS circuits receive input pulses continuously within intervals of 9 microseconds, each circuit will hold the signal at its (+) terminal in a binary ONE state. That is, when triggered by a pulse, each ROS circuit switches state and remains in that state if the following pulses occur within 9 microseconds. When a pulse is not received within that period, the ROS circuit "times out" or switches back to its initial state which forces the output signal at its (−) terminal to a binary ONE. In the absence of receiving any pulses at its input, each ROS circuit provides a binary ZERO output signal at its (+) terminal. That is, signals RSST110 through RSST910 are held in binary ZERO states.

The resettable one shot circuit 40-20 is dc coupled and arranged to switch the state of the output signal RS5CF10 at its (−) output terminal when its input gate 40-19 applies a binary ZERO signal level continuously for a predetermined period of time which corresponds to 30 microseconds, the period corresponding to the time it takes to read 5 frames or characters from the magnetic tape media. As long as the ROS circuit 40-20 does not have a continuous binary ZERO signal applied to its input, it holds signal RS5CF00 at its (+) output terminal in a binary ONE state. Where the circuit 40-20 switches state, it again switches back to its initial state as soon as gate 40-19 forces the input signal to a binary ONE.

The resettable one shot circuit 40-40 also dc coupled must have its input gate circuit 40-35 apply a binary ZERO signal level to the ROS circuit continuously for a period corresponding to the time it normally takes to read 15 frames from the magnetic tape media. When this happens, ROS circuit 40-40 switches the signal RS15F10 at its (−) output terminal from a binary ZERO to a binary ONE. The circuit 40-40 remains in that state until the gate 40-35 forces the input level to a binary ONE. As soon as gate 40-35 forces the input signal to a binary ONE, the ROS circuit 40-40 switches to its initial state forcing signal RS15F00 at its (+) output terminal from a binary ZERO to a binary ONE. The last resettable one shot circuit 40-30 has a minimum pulse width which corresponds to the time it takes the system to traverse one sixth of the space or gap between records, normally referred to as the interrecord gap. In this high density magnetic tape system, this interval approximates 1 millisecond. Thus, when the gate circuit 40-24 forces the input level to a binary ONE, the ROS circuit 40-30 switches the signal RDRRD10 and signal RDRRD00 to a binary ONE and a binary ZERO. Until the gate circuit 40-24 switches the level to a binary ZERO and it remains in that state continuously for a period of 1 millisecond, then ROS circuit 40-30 is operative to switch back to its initial state signalling the end of that record (i.e., signal RDRRD10 is switched to a binary ZERO and signal RDRRD00 is switched to a binary ONE).

In addition to the above-described selection of minimum time periods for the ROS circuits, it is important to note that various combinations of the output signals RSST110 through RSST910 have been selected for combining within AND gate and inverter amplifier circuits 40-10 through 40-12. These combinations have been selected to provide an average of the signals recorded in the nine channels of the tape medium and sensed by the amplifier circuits 10*a* through 10*j*. An average has been selected, since the signals being read have not been deskewed or aligned and can be all staggered or displaced in time within respect to one another. Since it is very important that an "actual" data record be detected as soon as possible under the worst conditions of skew to allow the system pseudo clock circuits to attain synchronization within a minimal period of time, it has been found desirable to combine the signals from different channels which are not necessarily adjacent (e.g. 4, 5 and 7 and 1, 2, and 6 and 3, 8 and 9) using a minimum of combinations (e.g. 3 for 9 channels) and then combine the results in a further AND gate 40-14 so that the absence of a positive result from any one of the combinations yields an indication that a frame is being sensed. Obviously, other ways of combining the channel signals to provide an average could also be used without departing from the present invention.

The signal RSFRD00 representing the averaging of the channel signals is then used to determine whether the requisite amount of frames have been sensed by forwarding the signal to the ROS circuits 40-20, 40-40 and 40-30 as shown. This determines the point when the system can reliably enter into a synchronization operation and then start transferring information through the registers of the deskew buffer section 20. The way in which the system determines the point to initiate synchronization will now be explained in detail.

OPERATION OF THE PREFERRED EMBODIMENT

Figure 3:
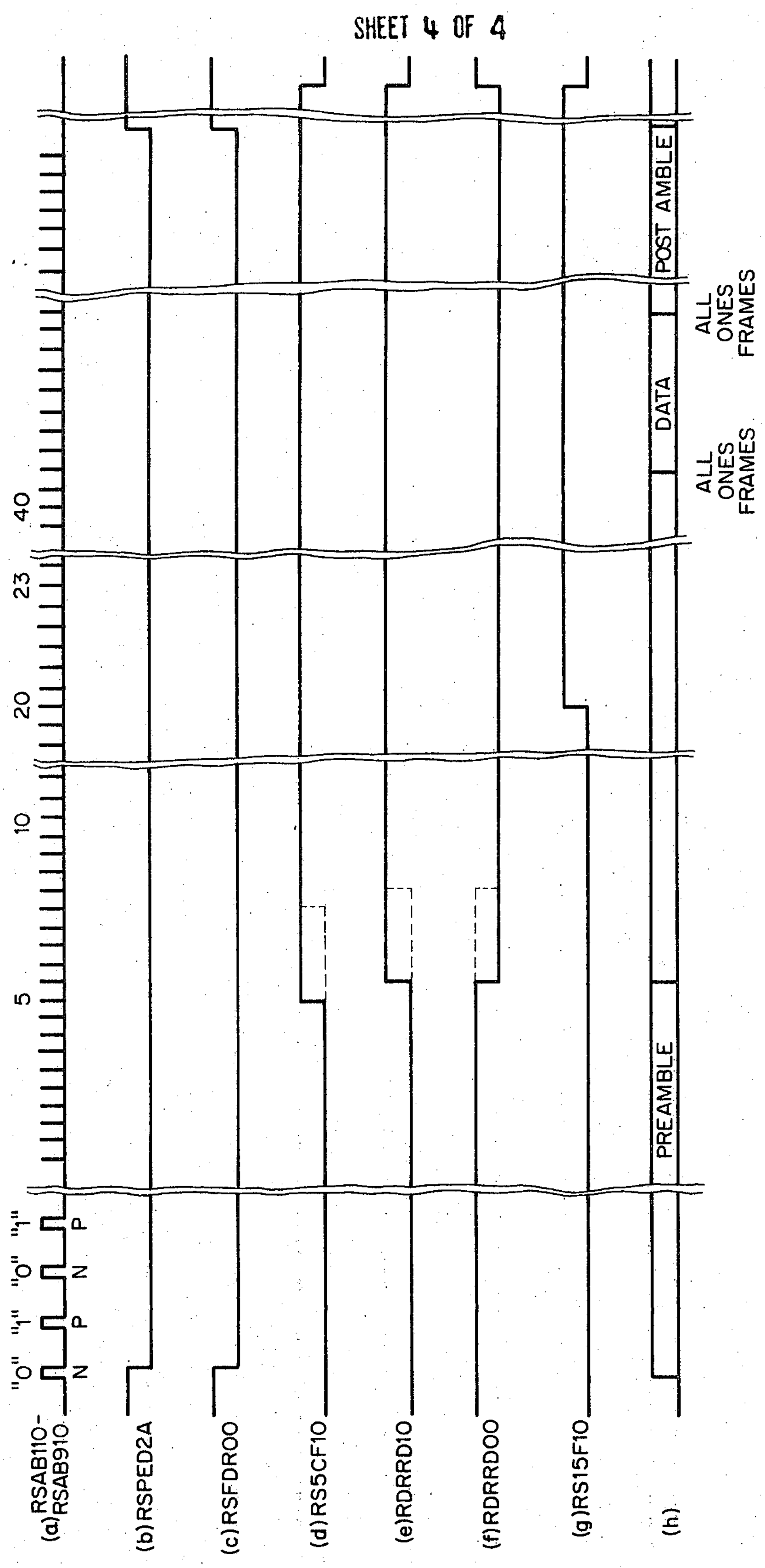
FIG. 3 illustrates the various waveforms present.

With reference to FIG. 3, the operation of the present invention in the system of FIG. 1 will now be described. Waveform *h* of FIG. 3 illustrates that an actual data record includes a synchronization portion including different bit patterns, a preamble portion including approximately 40 frames of all ZERO characters which terminates in an all ONES character or frame, a data portion including the data characters which terminates in an all ONES character, and a postamble portion including another group of all ZERO characters and the interrecord gap or space. The first portion of waveform *a* of FIG. 3, illustrates how the bit pattern 0101 recorded as positive and negative transitions in any one of the nine channels of the magnetic tape medium results in the series of pulses produced by the sense amplifier circuits 10*a* through 10*j*.

As seen from FIG. 1, the pulses representative of either binary ONES (positive transitions) or binary ZEROS (negative transitions) produced by each of the sense amplifier circuits are applied to a corresponding one of the ROS circuits 40-1 through 40-9. Prior to any pulses being applied to any one of these circuits, the signals RSST110 through RSST910 are binary ZEROS which in turn hold signals RSPED2A through RSPED2C binary ONES. This, in turn, forces averaging result signal RSFRD00 at a binary ONE. Thus, all of the ROS circuits 40-20, 40-30, and 40-40 are in an initial or first state which places signals RS5CF00, RS15F00 and RSRRD00 at binary ONES and signals RS5CF10, RS15F10 and RDRDP10 at binary ZEROS as illustrated by waveforms, *d, e, f* and *g* of FIG. 3.

As soon as any one of the ROS circuits 40-1 through 40-9 receives a pulse, it causes a corresponding one of the signals RSST110 through RSST910 to be switched from a binary ZERO to a binary ONE state. When the output signals from any one of the combinations of channels have switched to a binary ONE, it causes one of the AND gate and inverter circuits 40-10 through 40-12 to produce a binary ZERO signal at its output. For example, it is assumed that each of the sense amplifier circuits for channels 4, 5 and 7 have sensed data signals which in turn cause their corresponding ROS circuits to switch signals RSST710, RSST410 and RSST510 to binary ONES. This activates AND gate and amplifier circuit 40-10 to switch signal RSPED2A from a binary ONE to a binary ZERO as illustrated by waveform *b* of FIG. 3. As long as each of these three channels receives continuously pulses within intervals of 1.5 frames, continuously retriggering the associated ROS circuits preventing them from timing out and switching state, signal RSPED2A remains at a binary ZERO. As soon as any one of the ROS circuits of the three channels mentioned times out because it receives signals at a lower rate (longer than 1.5 frame intervals), it causes signal RSPED2A to be again switched to a binary ONE. The other ROS circuits and AND gate and amplifier circuits 40-10 through 40-12 operate in a fashion identical to that just described.

When one or more of the inverter output signals RSPED2A through RSPED2C is at a binary ZERO, this will maintain signal RSFRD00 at a binary ZERO which in turn causes gate circuit 40-19 to apply a binary ZERO signal level to ROS circuit 40-20. When this occurs, the ROS circuit starts timing out. If the input level remains at a binary ZERO for an interval of 5 frames which means that, on the average, approximately 5 consecutive frames of information from at least three channels have been received and that they have been received from all three channels at a rate which corresponds to the nominal byte or character rate of the system, ROS circuit 40-20 times out.

Only when both criteria have been met does the ROS circuit 40-20 time out and switch state. As seen from waveform *d* of FIG. 3, this forces signal RS5CF10 to a binary ONE. Also, signal RS5CF00 switches to a binary ZERO. The dotted lines on the waveform *d* illustrate the delay in time out when both criteria are not met immediately (i.e., not met within the first five frames intervals).

When ROS circuit 40-20 times out, it causes the record detector ROS circuit 40-30 to be switched on which results in signal RDRRD10 and signal RDRRD00 respectively being switched to a binary ONE and a binary ZERO. This change of state in these signals is illustrated by waveforms *e* and *f* of FIG. 3. The record detector signal RDRRD10 is applied to the tape circuits of the device signalling the start of a processing operation. The signal RDRRD00 when applied to gate and amplifier circuit 40-18 holds ROS circuit 40-20 in the same state and as illustrated by FIG. 2, places register 26 of the deskew buffer section 20 in a condition to store signals from register 26. Up to this time, it will be noted that no attempt has been made to have the pseudo clock circuits start synchronizing with the input signals. Synchronization is initiated by signal RSCER10 which is forced to a binary ONE when signal RS5CF10 switches to a binary ONE. As seen from FIG. 1*a*, signal RSCER10 switches each of the circuits 30-1 through 30-9 to a binary ONE state upon the arrival of a binary ONE signal. This, in turn, forces signals RSCE110 through RSCE910 to binary ONES which condition each of the clock circuits to start synchronizing to the input rate by adjustment of their frequency. At the same time, because the ROS circuit 40-40 has not timed out, it holds signal RS15F10 in a binary ZERO state. This signal conditions each of the pseudo clock circuits only to synchronize from pulses representative of binary ZEROS.

When approximately 20 consecutive frames have been read indicative of an actual data record, the pseudo clock circuits will be in synchronism. At this time, as illustrated by waveform *g* of FIG. 3, ROS circuit 40-40 times out and switches state. This causes signal RS15F10 and signal RS15F00 respectively to be switched to a binary ONE and a binary ZERO states. The signal RS15F10 conditions each of the pseudo clock circuits now to respond to the pulses representative of both binary ONE and binary ZERO data. Additionally, as seen from FIG. 1*a*, signal RS15F10 enables the output signals which define the 25 percent point of bit cell interval to be applied to the register 22 of the deskew buffer section 20 thereby enabling the section to begin its transfer of the information read by sense amplifier circuits 10*a* through 10*j*. The system now begins sensing for certain character patterns, such as consecutive all ZERO characters or frames and ultimately an all ONES character or frame.

In some instances, it may be desired to provide additional criteria which must be satisfied before the system initiates processing the signals being read as an actual data record. For example, in order to provide that the 15 frames also constitute consecutively read characters in addition to satisfying the criteria required to switch ROS circuit 40-20, this can be accomplished by eliminating signal RDRRD00 as an input to gate and amplifier circuit 40-19 or delaying it before it is applied as an input to gate circuit 40-19. In this case, the signal FS15F10 instead of signal RS5CF10 is applied as an input to the record detector circuit AND gate 40-22. Accordingly, the ROS circuit 40-30 will not be activated unless at least 20 consecutive frames of information conforming to the criteria established by signal RSFRD00 have been read.

Referring back to FIG. 3, it is seen that the waveforms discussed above remain in their same state until the termination of the postamble portion of the record. At this point, since none of the three combinations of channels receive signals at the nominal rate, signals RSPED2A through RSPED2C switch to binary ONES which in turn switches signal RSFDR00 to a binary ONE. This forces gate circuit 40-19 to apply a binary ONE level to ROS circuit 40-20 switching signal RS5CF10 to a binary ZERO as shown by waveform *d* of FIG. 3. This disables the pseudo clock circuits of FIG. 1.

When ROS circuit 40-20 switches state, it also causes gate circuit 40-35 to apply a binary ONE signal level to ROS circuit 40-40 by switching signal RS5CF00 to a binary ONE. As illustrated by waveform *g* of FIG. 3, this causes ROS circuit 40-40 to switch state immediately, forcing signal RS15F10 and signal RS15F00 to a binary ZERO and a binary ONE respectively. The signal RS15F10 conditions the circuits of FIG. 1*a* associated with register 22 to discontinue generating output signals RS75110 through RS75910 of the pseudo clock circuits from being applied to the register storage circuits.

It will also be noted that as soon as signal RSFRD00 is forced to a binary ONE, AND gate and amplifier circuit 40-22 is operative to cause gate 40-24 to apply a binary ZERO signal level to record detector ROS circuit 40-30 causing it to begin timing out. After the switching of ROS circuit 40-20, the signal RS5CF10 is operative to maintain the ZERO signal level even when signal RSFRD00 switches to a ZERO. After approximately 1 millisecond, the ROS circuit 40-30 times out and switches state which forces signal RDRRD10 and signal RDRRD00 to a binary ZERO and a binary ONE as illustrated by waveforms *e* and *f* of FIG. 3. The signal RDRRD00 inhibits register 26 from transferring further information to the rest of the system during the interrecord gap interval. Also, the signal RDRRD00 enables ROS circuit 40-20 to be again responsive to the averaging result signal RSFRD00 which readies the section 40 for processing a next record.

From the foregoing, it is seen that the apparatus of the present invention provides a reliable way of initiating the synchronizing to and the processing of data records recorded at high densities by permitting such operations to take place only after a number of different criteria has been satisfied. The criteria involves receipt of a predetermined number of frame characters or bytes which occur consecutively at a rate corresponding to an average of the signals from a plurality of information channels of the recording magnetic medium. This arrangement therefore insures that synchronization is only initiated reliably in accordance with the established criteria under all conditions of skewing of the magnetic media and nominal changes in byte or frame rate. Further, by having the apparatus of the present invention operate in a self-clocked fashion, it is able to process reliably signals recorded at high densities.

It will be obvious to those skilled in the art that numerous changes can be made to the preferred embodiment without departing from the teachings of the present invention. For example, various other combinations of signals can be used to establish an average rate of signals. Additionally, it may be desirable to add another set of circuits similar to gate 40-10 through 41-14 which provide a different criteria (e.g. signals from any one of three channels) and which can be enabled as required.

While in accordance with the provisions and statutes, there has been illustrated and described the best form of the invention known, certain changes may be made in the technique and system described without departing from the spirit of the invention as set forth in the appended claims and that in some cases, certain features of the invention may be used to advantage without a corresponding use of other features.

Having described the invention, what is claimed as new and novel is:

1. Valid record detecting apparatus for eliminating the effects of noise signals from any one of a plurality of information channels of a magnetic medium read by a plurality of sense circuits, each of said sense circuits being operative to provide pulses representative of binary ONE and binary ZERO information for transfer to a utilization device for processing, said detecting apparatus comprising:

a plurality of input resettable one shot circuit means, one individually coupled to each of said plurality of sense circuits for receiving said pulses, each of said plurality of resettable one shot circuit means being operative to produce a predetermined output signal level in response receiving pulses at a predetermined rate;

logic gating means coupled to each of said plurality of resettable one shot circuit means, said gating means including means for selectively combining predetermined output signal levels from different ones of said resettable one shot circuits to produce a first output signal; and, first resettable one shot circuit means coupled to said logic gating means, said first resettable one shot circuit means being operative to be switched from a first to a second state only upon being conditioned by the continuous application of said first output signal for a first predetermined time interval indicating that said sense circuits have read a first predetermined number of bytes, said first resettable one shot circuit means being operative when switched to said second state to generate a second output signal to condition said utilization device to begin a first operation in initiating the processing of pulses subsequently read from said plurality of information channels as an actual data record.

2. The apparatus of claim 1 wherein each of said plurality of input resettable one shot circuit means being selected to have a predetermined pulse width corresponding to a predetermined number of frames, said each resettable one shot circuit means having input terminal and at least one output terminal, said each of said input resettable one shot circuit means being operative in response to an input pulse to switch from a first state to a second state and remain in said second state as long as said input pulses are received within an interval less than said pulse width.

3. The apparatus of claim 2 wherein said logic gating means includes:

a plurality of input gating means, each of said input gating means being coupled to predetermined ones of the output terminals of said plurality of input resettable one shot circuit means; and, output gating means being coupled to said plurality of input gating means and operative to combine logically signals from said plurality of input gating means to produce said first output signal.

4. The apparatus of claim 3 wherein each of said input gating means includes an AND gate and inverter circuit means coupled to said AND gate, and wherein said output gating means includes an AND gate.

5. The apparatus of claim 4 wherein each AND gate receives signals from said predetermined ones of said output terminals corresponding to a different exclusive set of said plurality of said resettable one shot circuit means.

6. The apparatus of claim 1 further including:

second resettable one shot circuit means coupled to receive said second output signal from said first resettable one shot circuit means, said second resettable one shot circuit means being operative to be switched from a first to a second state only upon being conditioned by the continuous application of said second output signal for a second predetermined time interval indicating that said sense circuits have read a second predetermined number of bytes, said second resettable one shot circuit means being operative when switched to said second state to generate a second output signal to condition said utilization device to initiate a second operation in initiating the processing of pulses subsequently read from said plurality of information channels.

7. The apparatus of claim 6 wherein said first and second predetermined time intervals are different.

8. The apparatus of claim 6 further including a third resettable one shot circuit means coupled to receive said first and second output signals, said third resettable one shot circuit being switched from a first to a second state upon the switching of said first resettable circuit means to said second state, means coupling said third resettable one shot circuit means to said first resettable one shot circuit means, said third resettable one shot circuit means being operative to maintain said first resettable one shot circuit means in said second state.

9. The apparatus of claim 8 wherein said third resettable one shot circuit means is selected to have a pulse width great enough to determine the termination of said pulses.

10. Synchronizing data recovery apparatus for reliably recovering self clocking digital information signals of data records recorded in a plurality of channels on a record media, each data record having a preamble set and preamble set of synchronization signals bracketing said data record, said synchronizing data recovery apparatus comprising:

a plurality of sense circuits one individually coupled to each of said plurality of channels, said one circuit being operative to provide pulses representative of binary ONE and binary ZERO signals;

deskew buffer means coupled to said sense circuits, said deskew buffer means being operative to hold said digital information signals received from said sense circuits for transfer to a utilization device; and, allow synchronization control means, coupled to said plurality of sense circuits and to said deskew buffer means, said control means including:

a plurality of input resettable one shot circuit means, one individually coupled to each of said plurality of sense circuits for receiving pulses, each of said plurality of resettable one shot circuit means being operative to produce a predetermined output signal level in response to receiving pulses at a predetermined rate;

logic circuit means coupled to each of said plurality of resettable one shot circuit means, said logic circuit means including means for selectively combining predetermined output signal levels from different ones of said resettable one shot circuits to produce a first output signal; and, first resettable one shot circuit means coupled to said logic circuit means, said first resettable one shot circuit means being operative to be switched from a first to a second state only upon being conditioned continuously by said output signal for a predetermined time interval indicating that said sense circuits have read a predetermined number of bytes, said first resettable one shot circuit means being operative when switched to said second state to apply a second output signal to said deskew buffer means, conditioning said buffer means to hold said digital signals.

11. The apparatus of claim 10 wherein each of said plurality of input resettable one shot circuit means being selected to have a predetermined pulse width corresponding to a predetermined number of frames, said each resettable one shot circuit means having input terminal and at least one output terminal, said each of said input resettable one shot circuit means being operative in response to an input pulse to switch from a first state to a second state and remain in said second state as long as said input pulses are received within an interval less than said pulse width.

12. The apparatus of claim 11 wherein said logic gating means includes:

a plurality of input gating means, each of said input gating means being coupled to predetermined ones of the output terminals of said plurality of input resettable one shot circuit means; and, output gating means being coupled to said plurality of input gating means and operative to combine logically signals from said plurality of input gating means to produce said first output signal.

13. The apparatus of claim 12 wherein each of said input gating means includes an AND gate and inverter circuit means coupled to said AND gate, and wherein said output gating means includes an AND gate.

14. The apparatus of claim 13 wherein each AND gate receives signals from said predetermined ones of said output terminals corresponding to a different exclusive set of said plurality of said resettable one shot circuit means.

15. The apparatus of claim 10 further including:

second resettable one shot circuit means coupled to receive said second output signal from said first resettable one shot circuit means, said second resettable one shot circuit means being operative to be switched from a first to a second state only upon being conditioned by the continuous application of said second output signal for a second predetermined time interval indicating that said sense circuits have read a second predetermined number of bytes, said second resettable one shot circuit means being operative when switched to said second state to generate a second output signal to condition said utilization device to initiate a second operation in initiating the processing of pulses subsequently read from said plurality of information channels.

16. The apparatus of claim 15 wherein said first and second predetermined time intervals are different.

17. The apparatus of claim 16 wherein the sum of said first and second predetermined interval approximates one half of the total number of synchronization signals included in said preamble set of synchronization signals.

18. In a data recovery system for processing digital signals corresponding to bytes simultaneously recorded in a plurality of channels of a magnetic medium read by a corresponding number of sense circuits and transferred to a utilization device, synchronization apparatus for sensing when said system can reliably being processing said digital signal as an actual data record, said apparatus comprising:

a plurality of input resettable one shot circuit means, one individually coupled to each of said plurality of sense circuits for receiving said pulses, each of said plurality of resettable one shot circuit means being operative to produce a predetermined output signal level in response receiving pulses at a predetermined rate;

logic gating means coupled to each of said plurality of resettable one shot circuit means, said gating means including means for selectively combining predetermined output signal levels from different ones of said resettable one shot circuits to produce a first output signal; and, first resettable one shot circuit means coupled to said logic gating means, said first resettable one shot circuit means being operative to be switched from a first to a second state only upon being conditioned by the continuous application of said first output signal for a first predetermined time interval indicating that said sense circuits have read a first predetermined number of bytes, said first resettable one shot circuit means being operative when switched to said second state to generate a second output signal to condition said utilization device to begin a first operation in initiating the processing of pulses subsequently read from said plurality of information channels as an actual data record.

19. The system of claim 18 wherein each of said plurality of input resettable one shot circuit means being selected to have a predetermined pulse width corresponding to a predetermined number of frames, said each resettable one shot circuit means having input terminal and at least one output terminal, said each of said input resettable one shot circuit means being operative in response to an input pulse to switch from a first state to a second state and remain in said second state as long as said input pulses are received within an interval less than said pulse width.

20. The system of claim 19 wherein said logic gating means includes:

a plurality of input gating means, each of said input gating means being coupled to predetermined ones of the output terminals of said plurality of input resettable one shot circuit means; and, output gating means being coupled to said plurality of input gating means and operative to combine logically signals from said plurality of input gating means to produce said first output signal.

21. The system of claim 20 wherein each of said input gating means includes an AND gate and inverter circuit means coupled to said AND gate, and wherein said output gating means includes an AND gate.

22. The system of claim 21 wherein each AND gate receives signals from said predetermined ones of said output terminals corresponding to a different exclusive set of said plurality of said resettable one shot circuit means.

* * * * *

UNITED STATES PATENT OFFICE
CERTIFICATE OF CORRECTION

Patent No. 3,810,231 Dated May 7, 1974

Inventor(s) David D. DeVoy, George J. Barlow, John A. Klashka

It is certified that error appears in the above-identified patent and that said Letters Patent are hereby corrected as shown below:

Column 3, line 43, delete "a set of waveforms used to illustrate the" and insert --in greater detail a portion of deskew buffer section 20--.

Column 3, line 44, delete "operation of the apparatus of the present invention".

Column 4, line 16, delete "22" and insert --24--.

Column 11, line 9, delete "a" and insert --an--.

Column 12, line 37, delete "media" and insert --medium--.

--postamble--.

Column 14, line 4, delete "being" and insert --begin--.

Signed and sealed this 19th day of November 1974.

(SEAL)
Attest:

McCOY M. GIBSON JR.
Attesting Officer

C. MARSHALL DANN
Commissioner of Patents